United States Patent
Durand et al.

(10) Patent No.: US 9,757,931 B2
(45) Date of Patent: Sep. 12, 2017

(54) METHOD FOR COATING AN ELEMENT WITH A COATING LAYER

(75) Inventors: Nathalie Durand, Cergy (FR); Hugo Piccin, Paris (FR)

(73) Assignee: Faurecia Interieur Industrie, Nanterre (FR)

( * ) Notice: Subject to any disclaimer, the term of this patent is extended or adjusted under 35 U.S.C. 154(b) by 656 days.

(21) Appl. No.: 14/111,437

(22) PCT Filed: Apr. 12, 2012

(86) PCT No.: PCT/EP2012/056648
§ 371 (c)(1),
(2), (4) Date: Oct. 11, 2013

(87) PCT Pub. No.: WO2012/140119
PCT Pub. Date: Oct. 18, 2012

(65) Prior Publication Data
US 2014/0027052 A1  Jan. 30, 2014

(30) Foreign Application Priority Data
Apr. 12, 2011  (FR) ...................... 11 53184

(51) Int. Cl.
*B32B 37/14* (2006.01)
*B44C 1/10* (2006.01)
*B44C 3/02* (2006.01)
*B44C 5/04* (2006.01)

(52) U.S. Cl.
CPC ............... *B32B 37/14* (2013.01); *B44C 1/10* (2013.01); *B44C 3/02* (2013.01); *B44C 5/04* (2013.01); *Y10T 156/1062* (2015.01)

(58) Field of Classification Search
CPC ...... Y10T 156/1062; B32B 37/14; B44C 1/10
See application file for complete search history.

(56) References Cited

U.S. PATENT DOCUMENTS

| | | | |
|---|---|---|---|
| 3,737,365 A | 6/1973 | Smith | |
| 2007/0210484 A1* | 9/2007 | Fantin | B29C 43/18 264/259 |
| 2011/0260359 A1 | 10/2011 | Durand et al. | |

FOREIGN PATENT DOCUMENTS

| | | |
|---|---|---|
| DE | 10025360 C1 | 10/2001 |
| DE | 10105179 A1 | 8/2002 |
| FR | 2929880 | 10/2009 |

OTHER PUBLICATIONS

International Search Report for application No. PCT/EP2012/056648, dated Jul. 9, 2012, 3 pages.

* cited by examiner

*Primary Examiner* — Mark A Osele
*Assistant Examiner* — Christopher C Caillouet
(74) *Attorney, Agent, or Firm* — Reising Ethington P.C.

(57) ABSTRACT

A method for coating a surface of a supporting element with a layer of ligneous material in order to form a motor vehicle trim element. The method includes the following consecutive steps: precutting the coating layer so as to form at least one precut area in the layer of ligneous material; positioning the layer of ligneous material relative to the supporting element by means of the precut area; and attaching the layer of ligneous material to the surface of the supporting element.

12 Claims, 1 Drawing Sheet

METHOD FOR COATING AN ELEMENT WITH A COATING LAYER

Figure 1:
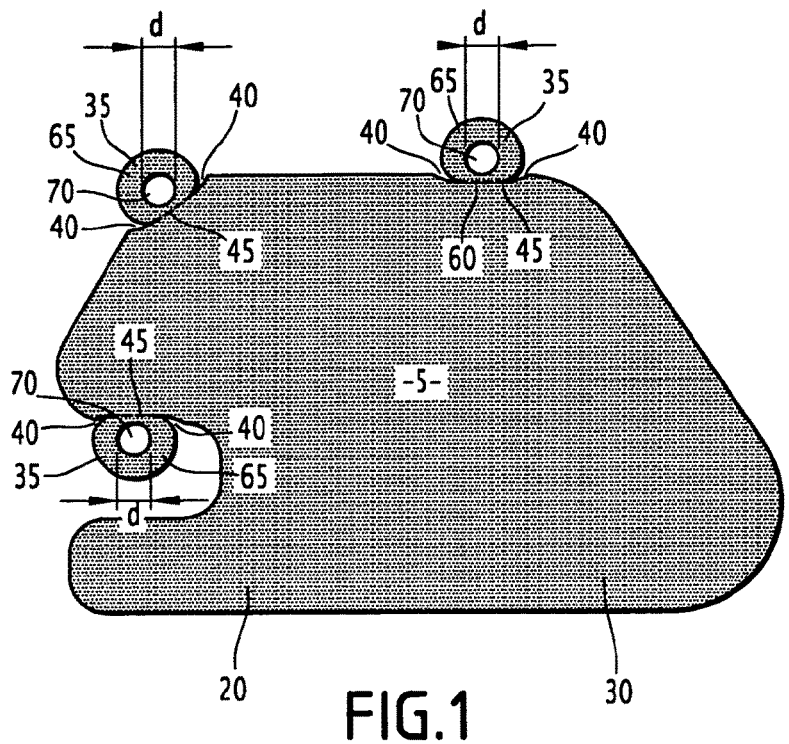

The present invention relates to a method for coating a surface of a supporting element with a layer of ligneous material to form a trim element.

It applies, inter alia, to the production of trim elements for motor vehicles, such as door panels or trim panels for a dashboard, or decorative coatings in a large number of other applications.

FR 2,929,880 for example relates to a method for coating a surface of a supporting element with a layer of ligneous material to form a trim element for a motor vehicle, in which the supporting element and the layer are each positioned on part of a compression mold. The layer of ligneous material is fastened by hooks to one of the parts of the mold. Then, the part supporting the supporting element is moved toward the part supporting the layer so as to press the supporting element and the layer against each other to obtain the trim element.

In this method, the layer of ligneous material must adopt the shape of one of the parts of the mold when it is positioned on that part of the mold. However, it has the drawback that depending on the three-dimensional shape to be adopted, the positioning of the layer of ligneous material on one of the parts of the mold is difficult and the risk exists that, during the coating method, the layer of ligneous material may be incorrectly in contact with or incorrectly positioned with respect to the supporting element. Yet incorrect positioning of the layer of ligneous material causes defects in the aesthetic appearance of the trim element produced using the method, such as incorrect orientation of the layer of ligneous material with respect to the supporting element or cracks in the layer of ligneous material near the fastening points of the ligneous material in the mold. These defects mean that the element can no longer be used in a vehicle, which causes excess production costs.

One aim of the present invention is to offset this drawback and propose a method that guarantees that the layer of ligneous material is correctly oriented with respect to the supporting element when the latter are put in contact so as to obtain a trim element having a satisfactory appearance.

To that end, the invention relates to a method for coating a surface of a supporting element using a layer of ligneous material to form a trim element comprising the following successive steps:
  precutting the coating layer so as to form at least one precut area in the layer of ligneous material,
  positioning the layer of ligneous material with respect to the supporting element using the precut area, and
  attaching the layer of ligneous material to the surface of the supporting element.

The method according to the invention has the advantage that the correct positioning of the layer with respect to the supporting element is done simply and inexpensively.

According to other embodiments, the invention includes one or more of the following features:
  the layer of ligneous material is fastened to a first part of a forming tool of the trim element by means of the precut area so as to keep the layer of ligneous material in position with respect to the first part of the forming tool,
  the first part of the forming tool includes fastening means and the precut area includes an opening suitable for cooperating with one of the fastening means,
  one fastening means has a shape substantially complementary to that of the opening, the diameter of said fastening means being larger than or equal to the diameter of the opening,
  the layer of ligneous material is flexible and suitable for adopting the three-dimensional shape of the surface of the supporting element to be coated,
  the layer of ligneous material is fastened to the surface of the supporting element by compression or thermocompression,
  each precut area is outside a coating area of the layer of ligneous material, the coating area being designed to coat all or part of the supporting element,
  precut areas are removed from the layer of ligneous material after fastening the layer of ligneous material to the surface of the supporting element,
  each precut area is not removed from the layer of ligneous material after the layer of ligneous material is attached to the surface of the supporting element,
  the precut area is in the shape of an ear separated from the coating area by two slits, the precut area being connected to the coating area by a connecting area extending between the slits, and
  the layer of ligneous material is a layer with a base of a lignocellulose material, a lignocellulose complex or a coating comprising a plurality of lignocellulose material-based layers.

Figure 2:
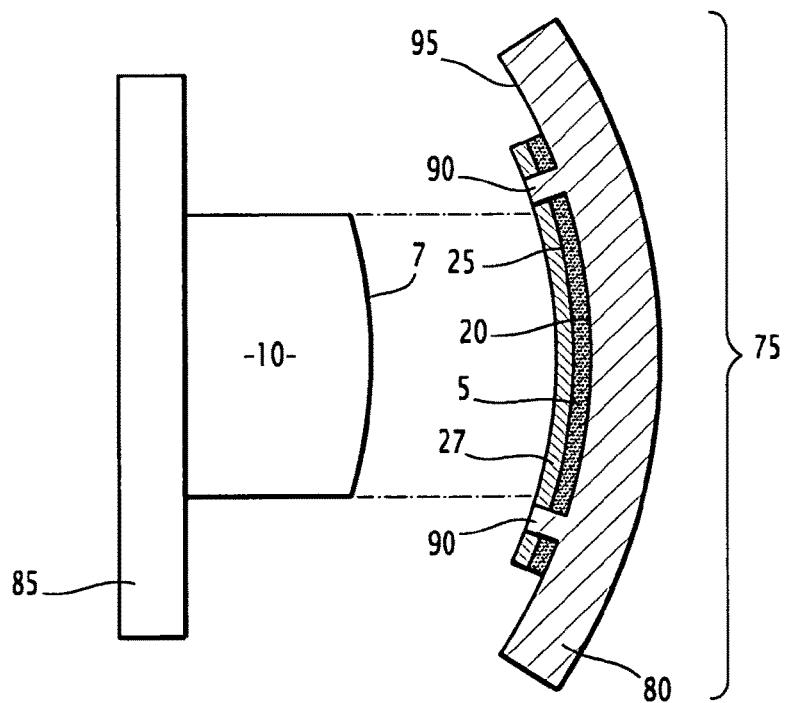

The invention will be better understood upon reading the following description, provided solely as an example and done in reference to the appended drawings, in which:

FIG. 1 is a diagrammatic front view of a layer of ligneous material suitable for carrying out the coating method according to the invention; and FIG. 2 is a diagrammatic cross-sectional view of the layer of ligneous material of FIG. 1 and the supporting element, which are fastened to a first and second part of a forming tool, respectively.

FIG. 1 shows a layer of ligneous material designated by reference 5. The layer 5 has a thickness substantially comprised between 0.1 and 2 mm. The layer 5 is designed to completely coat the surface 7 of a supporting element 10 to form a trim element. Alternatively, the layer 5 is designed to partially coat the surface 7. The surface 7 has a complex three-dimensional shape such as a non-developable surface. A three-dimensional shape means that the surface 7 extends in terms of width, height and depth. The layer 5 includes a visible surface 20 and a contact surface 25 (not shown in FIG. 1). The visible surface 20 is the surface of the trim element that will be visible when the trim element is used for example to trim the door or dashboard of a motor vehicle.

The layer 5 of ligneous material is flexible and suitable for adopting, under mechanical stress, the three-dimensional shape of the surface 7 of the supporting element 10 to be coated.

The layer 5 of ligneous material is a layer with a base of a lignocellulose material, a wood sheet, a lignocellulose complex or a coating comprising a plurality of lignocellulose material-based layers.

Alternatively, the layer 5 of ligneous material includes, on its contact surface 25, a flexible support 27, such as a textile material, a paper or a rubber sheet. The flexible material 27 may include an adhesive surface oriented opposite the layer 5 and located across from the supporting element 10.

The layer 5 includes a coating layer 30 and at least one precut area 35. When the trim element is produced, at least part of the coating area 30 is visible from outside the element and forms at least one part of the outer surface of the element. The precut area 35 is not visible when the trim element is produced. Preferably, the layer 5 includes several precut areas 35.

The precut areas 35 are arranged on the periphery of the coating area 30. Between each precut area 35 and the coating area 30, two slits 40 are formed. The slits 40 are formed in the layer 5 so as to leave a connecting area 45 between the two slits 40.

The connecting area 45 connects the precut area 35 to the coating area 30. The connecting area 45 has a width 60 shown by a broken line in FIG. 1, the width 60 being chosen as a function of the nature of the layer 5 of ligneous material and its thickness. The width 60 is suitable for allowing flexibility between the coating area 30 and the precut area 35. However, an elongation between the coating area 30 and the precut area 35 would also make it possible to guarantee flexible maintenance between the coating area 30 and the precut area 35 during the forming operation. The width 60 is substantially comprised between 0.1 and 10 mm, and preferably between 1 and 5 mm.

The slits 40 are for example V-shaped. The width of the slits 40 therefore decreases from the periphery of the layer 5 toward the connecting area 45.

Each precut area 35 assumes the form of a pierced ear 65 including a central opening 70. The central opening 70 has a diameter d (shown in FIG. 1) substantially comprised between 5 and 10 mm, preferably a diameter equal to 6 mm. The pierced ear 65 thus forms a fastening ear.

The coating area 30 is suitable for completely coating the surface 7 of the supporting element 10. The coating area 30 therefore has a peripheral shape similar to that of the surface 7. The ears 65 are therefore not designed to come into contact with the surface 7 of the supporting element 10.

Alternatively, the coating area 30 has a variable shape depending on the aesthetics of the trim element to be obtained and is suitable for partially coating the surface 7, the layer 5 of ligneous material forming a local decoration on the supporting element 10.

The supporting element 10 is for example a plastic part.

A first embodiment of the coating method according to the invention will now be described.

The method includes the following three consecutive steps: a) precutting the coating layer 5 so as to form at least one precut area 35 in the layer 5 of ligneous material, b) positioning the layer 5 of ligneous material with respect to the supporting element 10 using the precut area 35, and c) attaching the layer 5 of the base material to the surface 7 of the supporting element 10.

Step a) consists of cutting the slits 40 in the layer 5 of ligneous material so as to form the coating area 30 and the precut area 35. Preferably, several precut areas 35 are formed. The precut areas 35 are arranged around the coating area 30. Each precut area 35 is pierced so as to form the central opening 70. The precut areas 35 are positioned around the coating area 30 so as to allow stable and effective maintenance of the layer 5 in a forming tool as described below.

Steps b) and c) are carried out using a forming tool 75 for a trim element. The forming tool 75 is for example a compression mold. The forming tool 75 includes a first part 80 and a second part 85. The first part 80 is suitable for receiving the layer 5 of ligneous material. The first part 80 thus includes fastening means 90 suitable for cooperating with the openings 70 of the precut areas 35. Each fastening means 90 is for example a lug with a shape substantially complementary to that of an opening 70. The diameter of said lug is for example larger than or equal to the diameter of one of the openings 70 so as to ensure forcible maintenance of the layer of ligneous material with respect to the first part of the mold 80 by pushing the precut areas in on the lugs. The first part 80 includes a receiving surface 95 having a three-dimensional shape substantially identical to that of the surface 7 of the supporting element 10. The second part 85 is suitable for receiving the supporting element 10 and has a shape complementary to the first part 80.

The forming tool may for example be as described in document FR 2,929,880.

Step b) consists of attaching the layer 5 to the first part 80 of the forming tool 75. Each precut area 35 cooperates with one of the fastening means 90 so as to keep the layer 5 of ligneous material in position with respect to the first part 80 of the forming tool 75 and orient the layer 5 with respect to the surface 7 of the supporting element 10 (see FIG. 2).

Step b) further consists of fastening the supporting element 10 to the second part 85 of the forming tool 75 such that the surface 7 is oriented toward the first part 80 of the forming tool 75. The orientation of the layer 5 with respect to the supporting element 10 is therefore determined.

Step c) consists of moving the second part 85 bearing the supporting element 10 toward the first part 80 bearing the layer 5 so as to attach the layer 5 of ligneous material on the surface 7 of the supporting element 10 by compression. The layer 5 comes into contact with the supporting element 10 according to the predetermined orientation and the layer 5 adopts the three-dimensional shape of the receiving surface 95 of the first part 80 of the forming tool 75, and therefore that of the surface 7 of the supporting element 10.

Attaching the layer 5 only using the precut areas 35 makes it possible to maintain and orient the layer 5 effectively and stably, while allowing the coating area 30 to preserve its flexibility, such that said coating area 30 closely hugs the shape of the supporting element 10 during the compression. In fact, the coating area 30 is not attached to the first part 80 of the forming tool 75 and can therefore move and deform with respect thereto. In particular, the small width of the connection area 45 allows the deformation of the coating area 30 with respect to the precut area 35. This allows proper positioning of the layer 5 in the forming tool 75 while guaranteeing a satisfactory coating of the supporting element 10.

Alternatively, the first part 80 bearing the layer 5 is moved toward the second part 85 bearing the supporting element 10.

Also alternatively, the layer 5 of ligneous material is fastened on the surface 7 of the supporting element 10 by thermocompression.

After the layer 5 is attached on the surface 7 of the supporting element 10, the second part 85 is separated from the first part 80. The cohesion between the layer 5 and the supporting element 10 being greater than the resistance between the fastening means 90 and the openings 70 of the precut areas 35, the second part 85 of the forming tool 75 bears the supporting element 10 coated with the layer 5 on its surface 7. Alternatively, an operator can unhook the precut areas 35 from the fastening means 90.

In a step d), the precut areas 35 are removed from the layer 5 after the layer 5 is attached on the surface 7 of the supporting element 10, for example by cutting precut areas 35. Alternatively, the precut areas 35 may themselves detach during the forming operation of the layer 5 and the supporting element 10 due to the stresses applied on said layer 5 by the forming tool. According to another alternative, the precut areas 35 are not removed from the layer 5 and are designed to be masked by other trim components or adjacent parts of the produced trim element.

The removal of the precut areas 35 thus prevents them from interfering with structural elements during the mounting of the trim element on the vehicle. However, it may be preferable to leave one or more precut areas 35 in position, for example to maintain the trim element during a subsequent step, but also to form a mistake-proofing means or safeguard or marking area.

The supporting element 10 coated with the layer 5 is stripped from the forming tool 75. The trim element is thus ready to be used.

Alternatively, the supporting element 10 is not coated with a single layer 5 of ligneous material, but several layers 5, each layer 5 partially coating the supporting element 10. In this alternative, the set of layers 5 may completely or partially coat the supporting element 10.

In a second embodiment, which differs from the first embodiment only as follows, the supporting element 10 is formed by the injection, into the forming tool 75 forming a sealed injection cavity, of a plastic material, the layer 5 being positioned against one of the surfaces of the injection cavity. In the second embodiment, the supporting element 10 is therefore formed and simultaneously coated by the layer 5.

Although the coating method according to the invention has been described in its application to a motor vehicle trim element, the method also applies to other fields, such as furniture, inside developments, boats, or airplane developments.

By applying the coating method according to the invention, it is possible to avoid incorrect placement of the layer 5 of ligneous material with respect to the supporting element 10, and a high-quality trim element is obtained. In particular, the adhesion between the supporting element 10 and the layer of ligneous material 5 is improved and homogenous over the entire coating area 30. Furthermore, a satisfactory aesthetic appearance of the obtained part is guaranteed over the entire coating area 30.

The invention claimed is:

1. A method for coating a surface of a supporting element using a layer of ligneous material to form a trim element, characterized by the following successive steps:
   precutting a coating layer of ligneous material so as to form at least one precut area in the layer of ligneous material,
   positioning the layer of ligneous material with respect to a supporting element using the precut area, and
   attaching the layer of ligneous material to a surface of the supporting element;
   wherein each precut area is outside a coating area of the layer of ligneous material, the coating area being designed to coat all or part of the supporting element; and
   wherein the precut area resides outside of the coating area, the precut area being separated from the coating area by two slits, the precut area being connected to the coating area by a connecting area extending between the slits.

2. The method according to claim 1, wherein the layer of ligneous material is fastened to a first part of a forming tool by means of the precut area so as to keep the layer of ligneous material in position with respect to the first part of the forming tool.

3. The method according to claim 2, wherein the first part of the forming tool includes fastening means and wherein the precut area includes an opening suitable for cooperating with one of the fastening means.

4. The method according to claim 3, wherein one fastening means has a shape substantially complementary to that of the opening, the diameter of said fastening means being larger than or equal to the diameter of the opening.

5. The method according to claim 1, wherein the layer of ligneous material is flexible and suitable for adopting a three-dimensional shape of the surface of the supporting element to be coated.

6. The method according to claim 1, wherein the layer of ligneous material is fastened to the surface of the supporting element by compression or thermocompression.

7. The method according to claim 1, wherein precut areas are removed from the layer of ligneous material after fastening the layer of ligneous material to the surface of the supporting element.

8. The method according to claim 1, wherein each precut area is not removed from the layer of ligneous material after the layer of ligneous material is attached to the surface of the supporting element.

9. The method according to claim 1, wherein the layer of ligneous material is a layer with a base of a lignocellulose material, a lignocellulose complex or a coating comprising a plurality of lignocellulose material-based layers.

10. The method according to claim 1, wherein the at least one precut area comprises a plurality of precut areas positioned around the coating area on a periphery thereof.

11. The method according to claim 10, wherein the at least one precut area comprises several precut areas positioned around the coating area on the periphery.

12. The method according to claim 10, wherein the at least one precut area comprises three precut areas positioned around the coating area on the periphery.

* * * * *